US008134559B2

(12) United States Patent
Pasula

(10) Patent No.: US 8,134,559 B2
(45) Date of Patent: *Mar. 13, 2012

(54) APPARATUS AND METHOD FOR ADJUSTING FOR INPUT LATENCY IN AN ELECTRONIC DEVICE

(75) Inventor: Markus I Pasula, Helsinki (FI)

(73) Assignee: RealNetworks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,586

(22) Filed: Jul. 15, 2011

(65) Prior Publication Data

US 2011/0270426 A1 Nov. 3, 2011

Related U.S. Application Data

(63) Continuation of application No. 11/450,154, filed on Jun. 9, 2006, now Pat. No. 7,982,739, which is a continuation-in-part of application No. 11/265,784, filed on Nov. 1, 2005.

(60) Provisional application No. 60/711,039, filed on Aug. 18, 2005.

(51) Int. Cl.
    G06T 13/00 (2006.01)
(52) U.S. Cl. ...................................... 345/473
(58) Field of Classification Search ................ 345/473; 463/37–39
    See application file for complete search history.

(56) References Cited

U.S. PATENT DOCUMENTS

| 5,586,257 | A | * | 12/1996 | Perlman ........................... 463/42 |
| 5,822,432 | A | | 10/1998 | Moskowitz et al. |
| 5,956,485 | A | * | 9/1999 | Perlman ........................ 709/204 |
| 5,974,442 | A | * | 10/1999 | Adams .......................... 709/200 |
| 6,029,000 | A | | 2/2000 | Woolsey et al. |
| 6,071,194 | A | | 6/2000 | Sanderson et al. |
| 6,475,090 | B2 | | 11/2002 | Roelofs |
| 6,718,544 | B1 | | 4/2004 | Humphreys et al. |
| 7,747,624 | B2 | | 6/2010 | Campos et al. |
| 2002/0107040 | A1 | | 8/2002 | Crandall et al. |
| 2002/0193162 | A1 | | 12/2002 | Walker et al. |
| 2003/0149743 | A1 | | 8/2003 | Baluja et al. |
| 2003/0149958 | A1 | | 8/2003 | Baluja et al. |
| 2005/0108690 | A1 | | 5/2005 | Lau et al. |
| 2005/0108691 | A1 | | 5/2005 | Lau et al. |

(Continued)

FOREIGN PATENT DOCUMENTS

WO     03067377 A2    8/2003

(Continued)

OTHER PUBLICATIONS

OA of Aug. 20, 2008, for U.S. Appl. No. 11/450,154, filed Jun. 9, 2006.

(Continued)

Primary Examiner — Jeffery A Brier
(74) Attorney, Agent, or Firm — Kory D. Christensen; Stoel Rives LLP

(57) ABSTRACT

Embodiments of methods, apparatuses, devices and systems associated with adjusting for input latency within an electronic are disclosed. An electronic device may receive a user input, such as a user actuation of a device key. A latency adjusted time of the input may be calculated based, at least in part, on a latency of the electronic device in determining the user actuation of the device key. The latency adjusted time may be used to determine a result of the user input.

34 Claims, 2 Drawing Sheets

U.S. PATENT DOCUMENTS

| | | |
|---|---|---|
| 2005/0108692 A1 | 5/2005 | Lau et al. |
| 2005/0155027 A1 | 7/2005 | Wei |
| 2006/0277209 A1 | 12/2006 | Kral et al. |
| 2007/0123347 A1 | 5/2007 | Walker et al. |

FOREIGN PATENT DOCUMENTS

| | | |
|---|---|---|
| WO | 03067456 A1 | 8/2003 |
| WO | 2004009197 A1 | 1/2004 |

OTHER PUBLICATIONS

OA of Jan. 29, 2009, for U.S. Appl. No. 11/450,154, filed Jun. 9, 2006.

OA of Jun. 3, 2009, for U.S. Appl. No. 11/450,154, filed Jun. 9, 2006.

NOA of Jun. 3, 2011, for U.S. Appl. No. 11/450,154, filed Jun. 9, 2006.

OA of Mar. 4, 2010, for U.S. Appl. No. 11/265,784, filed Nov. 1, 2005.

OA of Jul. 20, 2010, for U.S. Appl. No. 11/265,784, filed Nov. 1, 2005.

OA of Mar. 1, 2011, for U.S. Appl. No. 11/265,784, filed Nov. 1, 2005.

OA of Jul. 6, 2011, for U.S. Appl. No. 11/265,784, filed Nov. 1, 2005.

Labarta et al. (DiP: A parallel program development environment. In Proceedigns of the 2nd International EuoPar Conference, 1996).

OA of Jul. 8, 2009, for U.S. Appl. No. 11/265,784, filed Nov. 1, 2005.

Office Action mailed Dec. 7, 2009 for U.S. Appl. No. 11/450,154, filed Jun. 9, 2006.

* cited by examiner

APPARATUS AND METHOD FOR ADJUSTING FOR INPUT LATENCY IN AN ELECTRONIC DEVICE

This application is continuation of U.S. patent application Ser. No. 11/450,154, entitled "SYSTEM AND/OR METHOD FOR ADJUSTING FOR INPUT LATENCY IN A HANDHELD DEVICE," by Markus I. Pasula, and filed Jun. 9, 2006, now U.S. Pat. No. 7,982,739, which application a continuation-in-part of U.S. patent application Ser. No. 11/265,784, entitled "METHOD AND APPARATUS FOR GENERATING APPLICATION PROGRAMS FOR MULTIPLE HARDWARE AND/OR SOFTWARE PLATFORMS," by Markus I. Pasula, and filed on Nov. 1, 2005, which application claims the benefit pursuant to 35 U.S.C. 119 of U.S. Provisional Application No. 60/711,039, entitled "METHOD AND APPARATUS FOR AUTOMATICALLY CREATING CODE FOR MULTIPLE PLATFORMS," by Markus I. Pasula, and filed on Aug. 18, 2005.

BACKGROUND

The present application relates to keypads and methods of interpreting data using key pads.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1A:
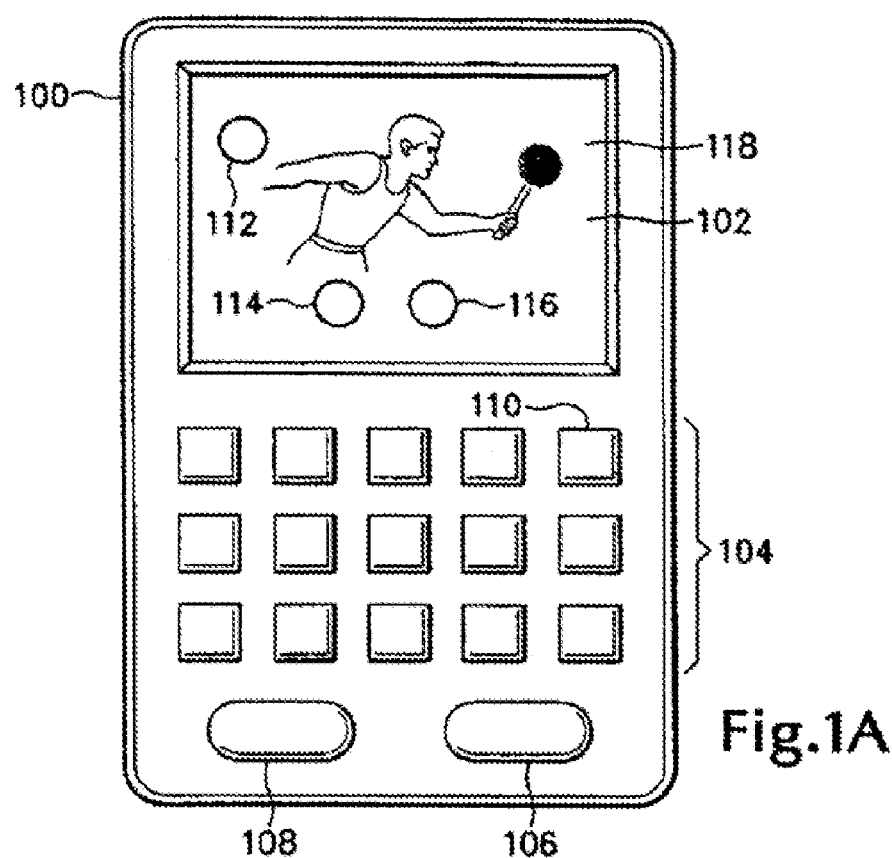
FIG. 1A is a schematic diagram of an embodiment, such as a mobile device operable to adjust for key latency.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects. In this context, instructions may be organized into a software, shareware, freeware, firm ware, or combinations thereof. In addition, instructions may be organized into subroutines, objects, and/or combinations thereof, for example. An "object" as referred to herein relates to one or more executable instructions, which may be stored in a memory associated with a computing system and/or computing platform and/or one or more data units and/or portions of data, for example.

"Storage medium" as referred to herein relates to media capable of maintaining expressions which are perceivable by one or more machines. For example, a storage medium may comprise one or more storage devices for storing machine-readable instructions, information, and/or objects. Such storage devices may comprise any one of several media types including, for example, magnetic, optical and/or semiconductor storage media. However, these are merely examples of a storage medium and claimed subject matter is not limited in these respects.

"Logic" as referred to herein relates to one or more structures for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "determining," "generating," "creating," "merging," "providing", "querying," "obtaining," "representing," "modifying," "receiving," "transmitting," "storing," and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "program," a "computer program," an "application program," and/or an "executable program" as referred to herein relates to an organized list of instructions and/or data that, if executed, results in or instructs a computer, computing device, handheld electronic device, device, and/or machine to behave in a particular manner. Here, for example, an executable program may comprise machine-readable instructions that are executable to perform one or more desired tasks. In one embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In an embodiment, for example, such an application may comprise a program that performs desired tasks in conjunction with a device, such as a handheld electronic device, although claimed subject matter is not limited in this respect. For example, an application may comprise one or more end-user programs, such as database programs, spreadsheet programs, word processor programs, and/or entertainment programs, that are accessible through a network browser, electronic mail, interactive games, video and/or image processing programs, calendars, financial application software, inventory control systems and/or the like. However, these are merely examples of an application and claimed subject matter is not limited in these respects.

A "device" as referred to herein relates to a computing platform, such as an at least somewhat portable computing platform. By way of example, a device may comprise a cellular telephone, a personal digital assistant, a portable music or video player, and/or a laptop computer for example, though of course claimed subject matter is not limited in this regard. For example, a device may comprise a computing platform which may be capable of executing one or more instructions, for example. A device may, for example, include one or more keys, such as a key pad on a cellular phone, though, of course, claimed subject matter is not limited in this regard. A "handheld electronic device" as referred to herein relates to an at least somewhat portable computing platform, such as a cellular telephone, a personal digital assistant, a portable music or video player, and/or a laptop computer for example, though of course claimed subject matter is not limited in this regard.

"Stored data" as referred to herein relates to information stored in a storage medium in some retrievable format. An "indicator" as used herein relates to information that may represent one or more aspects of a program, a hardware and/or software platform, such as a graphical depiction displayed on a display associated with a device, though, of course, this is merely an illustrative example and claimed subject matter is not limited in this regard. A "software platform" as referred to herein with respect to a particular program or programs relates to one or more programs which may run on a device, such that the particular program or programs may be capable of running on the device along with the software platform such that data and/or instruction may be passed from the particular program or programs to the device at least in part via the software platform. For example, a software platform may comprise an operating system and/or other software program which may provide an interface for an executable program, for example.

FIG. 1A is a schematic diagram of an embodiment, such as a device 100 operable to adjust for a key latency. Device 100 may comprise a display 102, such as one or more liquid crystal display (LCD) screens, for example. In addition, device 100 may further comprise one or more inputs, such as a key pad 104. Key pad 104, may comprise one or more buttons, such as buttons 106, 108, and/or 110, for example, which may be actuated by a user. Device 100 may be operable to display and/or capable of displaying one or more indicators, such a circles 112, 114, and/or 116, on display 102, for example, based at least in part on one or more instructions from software program. Device 100, may be further operable to display a graphical element, such as graphical element 118. Under some circumstances, device 100 may be operable to change and/or be capable of changing a display position associated with graphical element 118, such that graphical element 118 may appear to move at least in part relative to circles 112, 114, and/or 116 on display 102, for example. It should, however, be noted that the these are merely illustrative examples relating to a device and that claimed subject matter is not limited in this regard.

Figure 1B:
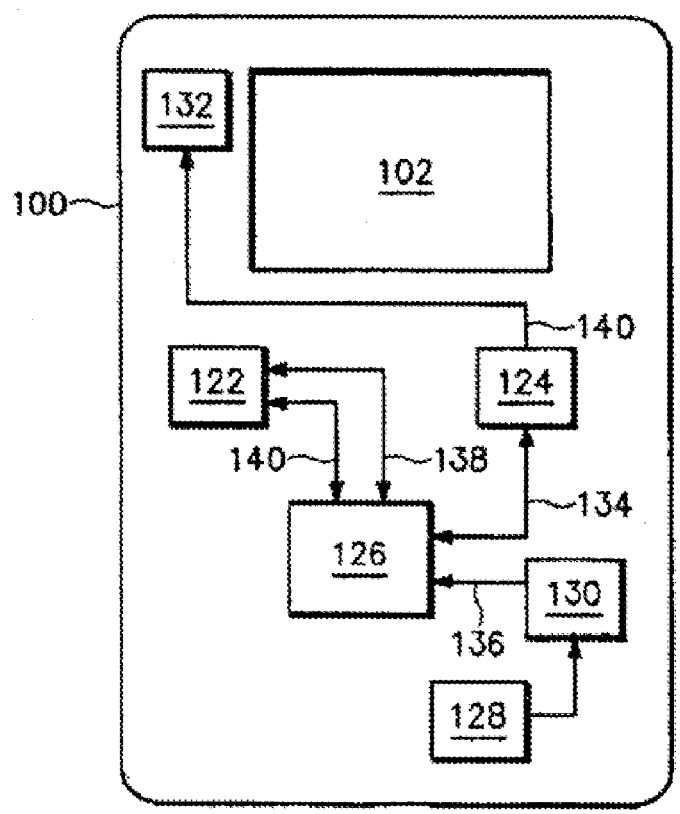
FIG. 1B is a schematic diagram showing one or more hardware components of an embodiment.
Figure 2:
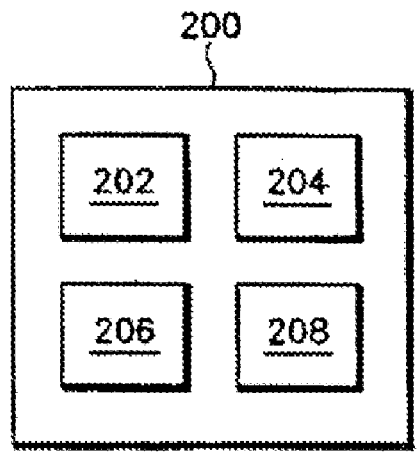
FIG. 2 is a schematic diagram of an embodiment, such as software capable of adjusting for key latency.

FIG. 1B is a schematic diagram of one or more hardware components of an embodiment, such as device 100. Device 100 may further comprise hardware: such as random access memory, read only memory, flash memory, one or more computational devices, such as one or more processors, Application specific integrated circuits (ASICs), digital signal processors, analog to digital converters, digital to analog converters, microphones, speakers, radios, and/or other circuitry for performing a variety of functions. For example, device 100 may include memory 122, a digital signal processor 124, an ASIC 126, a microphone 128, an analog to digital converter 130, a speaker 132, and/or one or more busses 134, 136, 138, and/or 140 for transferring signals among the various hardware of device 100. In addition, device 100 may further comprise a software platform, such as an operating system, such as a Java, a C, a C++, and/or a Windows based or other operating system, which may provide an application program interface (API) for an executable program which may be operable to run and/or execute on device 100. Device 100 may be operable to execute one or more programs, such as one or more software programs. By way of example, a software program may comprise a game and/or other program adapted to perform one or more functions, though, of course, claimed subject matter is not limited to this example. Device 100 may comprise a handheld electronic device, such as a cellular telephone, a personal digital assistant, a portable music or video player, and/or a laptop computer, for example FIG. 2 is a schematic diagram of an embodiment, such as a software program 200. By way of example, software program 200 may comprise a game, which may, under some circumstances be operable to run on one or more handheld electronic devices, such as device 100. In one embodiment, software program 200 may comprise an executable program compatible with one or more hardware and/or software platforms such as one or more of the hardware and/or software platforms described above. In addition, program 200 may comprise a display module 202. Display module 202 may comprise one or more instructions and/or data and may, under some circumstances, be operable, at least in part along with one or more portions of device 100, to display one or more indicators on display 102. The one or more indicators may comprise, but are in no way limited to, circles 112, 114, and/or 116 and/or graphical element 118, for example. Display module 202 may, under some circumstance, be further operable to change a display position associated with graphical element 118 and/or circles 112, 114, and/or 116, such that graphical element 118 may appear to move at least in part relative to circles 112, 114, and/or 116 on display 102 of device 100. It should, however, be noted that the these are merely illustrative examples relating to a program and that claimed subject matter is not limited in this regard.

Program 200 may further comprise a key pad input module 204, for example. Key pad input module 204 may comprise one or more instructions and/or data and may, under some circumstances, be operable to receive and/or store a signal generated based at least in part on a user actuation of a key, such as buttons 106, 108, and/or 110, for example. Key pad input module 204 may be further operable to associate a time with any received and/or stored signals, such as a time when key pad input module 204 received at least a portion of the signal, though, of course, claimed subject matter is not limited in this regard. For example, the time associated with a particular signal may be a time when a first portion of the signal is received, a time when a last portion of the signal is received, an average time in which the signal was received, and/or a variety of other times at least in part associated with key pad input module 204 receiving at least a portion of the signal. Key pad input module 204 may be further operable to receive and/or store a plurality of signals associated with a user actuation of a key. Likewise, key pad input module 204 may be operable to associate a time with one or more of the plurality of received and/or stored signals, such as a time when key pad module 204 received at least a portion of a respective signal. It should, however, be noted that the these are merely illustrative examples relating to a program and that claimed subject matter is not limited in this regard.

Program 200 may further comprise a latency adjustment module 206. Latency adjustment module 206 may comprise one or more instructions and/or data. Latency adjustment module 206 may, under some circumstances, be operable to adjust a time associated with one or more received signals based at least in part on a latency adjustment value. A latency adjustment value may be based at least in part on a determined latency associated with actuating one or more buttons on a device and the time associated with receiving a signal corresponding to the actuation. For example, different devices may have different latency based on a number of factors, such as hardware configuration, including memory, processing speed, communication speed between hardware components, and/or other physical parameters associated with the device. In addition, different devices may have different latency based on respective software configurations, such as different operating system software, for example. A determined latency may account for the various hardware and/or software differences which could affect a latency between key actuation and receiving a portion of a signal corresponding to the actuation. For example, a latency adjustment value may correspond to an average, mean, median, and/or mode latency associated with key pad actuation of device 100. The latency adjustment value may be determined in a variety of manners, such as by empirical testing of particular hardware and/or software platforms, statistical analysis of empirical testing, analysis of hardware and/or software characteristics of particular hardware and/or software platforms, manufacturer supplied data associated with a particular hardware and/or software platform, software simulation of one or more performance characteristics of particular hardware and/or software platforms, and/or one or more determined performance characteristics and/or benchmarks associated with device 100. In addition, a latency adjustment value may be determined by device 100, such as by statistical analysis of times associated with receiving a signal such that the latency adjustment value may change over time to adjust for one or more changes to performance characteristics associated with device 100. It should, however, be noted that these are merely illustrative examples relating to a program and/or latency adjustment and that claimed subject matter is, of course, not limited in this regard.

Program 200 may further comprise a calculation module 208. Calculation module 208 may comprise one or more instructions and/or data. Calculation module 208 may be operable to calculate a result, such as a user score, based at least in part on a latency adjusted time for a received signal and/or a relative position of graphical element 118 and at least one of circles 112, 114, and/or 116 at the latency adjusted time. Calculation module 208 may be further operable to calculate a result, such as a user score, based at least in part on a latency adjusted time for a received signal resulting from a key actuation and/or a relative position of graphical element 118 and at least one of circles 112, 114, and/or 116 at one or more latency adjusted times, such as successive latency adjusted times, for example. For example, if the latency adjusted time associated with a user actuation of a button, such as button 110 corresponds to a time when graphical element 118 was 75% aligned with circle 112, then the calculated result, may be based, at least in part, on the 75% alignment at the latency adjusted time. It should, however, be noted that these are merely illustrative example relating to a program and that claimed subject matter is not limited in this regard.

Figure 3:
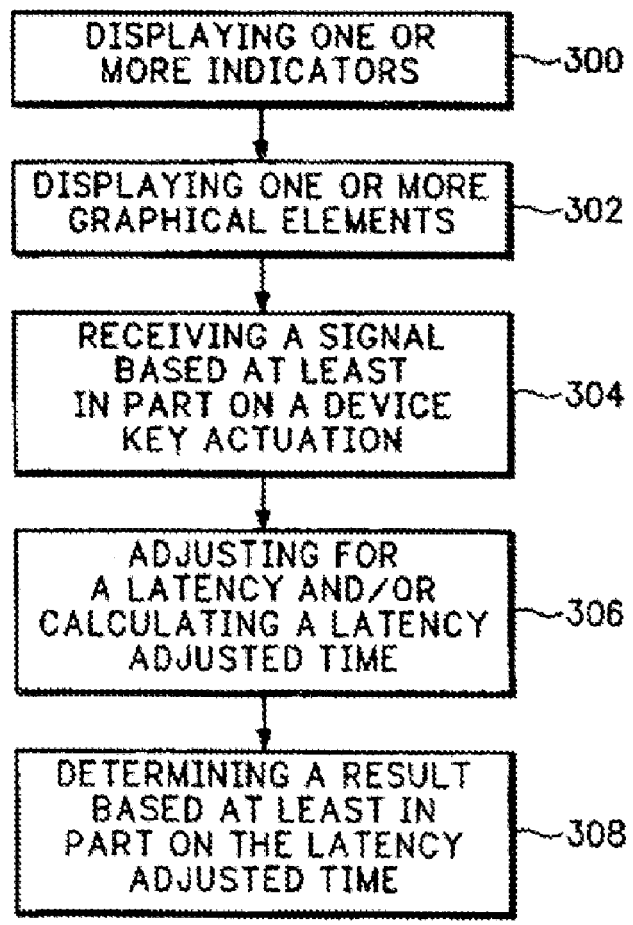
FIG. 3 is a flowchart of an embodiment, such as a method of adjusting for key latency.

FIG. 3 is a flowchart of an embodiment, such as a method for adjusting for a latency between a user actuating a key, such as buttons 106, 108, and/or 110, for example, and a signal associated with the actuation being received by a device, such as device 100, and/or a program, such as program 200. With regard to box 300, the method may comprise displaying one or more indicators, such as circles 112, 114, and/or 116. Displaying circles 112, 114, and/or 116 may comprise executing one or more instructions, associated with program 100 and, based at least in part on those instructions, instructing device 100 to display a graphical representation on the one or more indicators on a display, such as display 102, for example. Though, again, it should be noted that these are merely illustrative examples and that claimed subject matter is not limited in this regard.

With regard to box 302, the method may further comprise displaying an indicator, such as graphical element 118, for example. Displaying the indicator may comprise executing one or more instructions, associated with program 100 and, based at least in part on those instructions, instructing device 100 to display a graphical representation on the indicator on a display, such as display 102, for example. It should, however, be noted that these are merely illustrative examples relating to displaying an indicator and that claimed subject matter is not limited in this regard.

With regard to box 304, the method may further comprise receiving one or more signals, such as with program 200, at least in part associated with a device key actuation, such as a user actuating one or more of buttons 106, 108, and/or 110. For example, at least in part in response to a relative display position of graphical element 118 and/or circles 112, 114, and/or 116, a user may actuate a portion of key pad 104, such as button 110. The user actuation of button 110 may generate a signal, such as by closing and/or opening a particular circuit. The signal may be transmitted, such as by one of the above-described busses, to ASIC 126, for example. In an embodiment, program 200, one or more portions of program 200, and/or ASIC 126 may associate a time with any received signals, such as a time when program 200, one or more portions of program 200, and/or ASIC 126 received at least a portion of the one or more signals. In an embodiment, the time associated with a particular signal may comprise a time when program 200, and/or one or more portions of program 200, begins to receive a signal, receives a completed signal, and/or an average, mean, median, and/or mode time during which program 200 received a particular signal, to name but a few examples. It should, however, be noted that this is merely an illustrative example relating to receiving a signal and that claims subject matter is in no way limited in this regard.

With regard to box 306, the method may further comprise adjusting for a latency between actuating a device key, such as a user actuating buttons 106, 108, and/or 110, for example, receiving a signal associated with actuating the device key, and/or displaying a response to the actuation of the device key, for example. Adjusting for a latency may comprises calculating a latency adjusted time for a device key actuation based at least in part on the time associated with receiving a signal corresponding to a device key actuation and/or a latency adjustment value, as discussed above. For example, if a signal corresponding to the user actuation of button 110 may be assigned a time, such as T equals 8 microseconds, corresponding to when the signal was received. Program 200 may be operable to adjust the time associated with that signal to compensate for latency in device 100. For example, program 200 may subtract a latency adjustment value from the time associated with the user actuation of button 110. If, for example, the latency adjustment value is determined to by 5 microseconds for a particular device 100, program 200 may adjust the time associated with user actuation of button 110 such that time associated with the user actuation of button 110 is now T equal to 3 microseconds. However, it should be noted that these are merely illustrative examples and that claimed subject matter is not limited in this regard.

With regard to box 308, the method may further comprise determining and/or calculating a result, such as a user score, based at least in part on the latency adjusted time for a received signal and/or a relative position of a displayed indicator and one or more displayed objects. For example, the result may be calculated based on a relative position of graphical element 118 and at least one of the displayed circles 112, 114, and/or 116 at one or more latency adjusted times. For example, program 200 may determine a result based on the relative position of graphical element 118 and at least one of the displayed circles 112, 114, and/or 116 at the latency adjusted time associated with user actuation of button 110, which in this example would be 3 microseconds. For example, if at the latency adjusted time graphical element 118, was 75% aligned with circle 112, then the calculated result may be based, at least in part, on the 75% alignment at the latency adjusted time. It should, however, be noted that these are merely illustrative examples relating to adjusting for a latency and/or calculating a latency adjustment and that claimed subject matter is not limited in this regard. Determining a result may, under some circumstances, further comprise displaying a graphical indication of the calculated result, such as highlighting a relative position between graphical indicator 118 and one or more of circles 106, 108, and/or 110 at one or more respective latency adjusted times on device 100. For example, a graphical indication may be displayed on display 102 of device 100. In another embodiment, displaying a graphical indicator of the calculated result may comprise displaying a score on display 100. In an embodiment, displaying a graphical indicator of the calculated result may comprise modifying one or more graphical elements displayed on display 102, such that a user may perceive the calculated result. For example, displaying a graphical indicator of the calculated result may comprise changing one or more relative positions of one or more graphical elements displayed on display 102 and/or displaying one or more graphical affects to indicate the calculated results. Again, however, it should be noted that this is merely an illustrative example relating to an embodiment and that claimed subject matter is not limited in this regard.

It will, of course, also be understood that, although particular embodiments are described, claimed subject matter is not limited in scope to a particular embodiment or implementation. For example, one embodiment may be in hardware, such as implemented on a device or combination of devices, as previously described. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, handheld electronic device, device, or other system, for example, may result in an embodiment of a method of manufacturing an apparatus, system, and/or executable program in accordance claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of the claimed subject matter. However, it should be apparent to one skilled in the art having the benefit of this disclosure that claimed subject matter may be practiced without the specific details. In other instances, features that would be understood by one or ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method performed by an electronic device, the method comprising:
   determining user actuation of an input of the electronic device;
   determining a latency adjusted time of said user actuation of said input, said latency adjusted time being based on a latency of said electronic device in determining said user actuation of said input; and
   determining a result of said user actuation of said input based, at least in part, on said latency adjusted time, wherein said result is determined within the electronic device.

2. The method of claim 1, wherein said electronic device comprises a display, the method further comprising displaying information on said display, said information being based, at least in part, on said result.

3. The method of claim 1, wherein said electronic device comprises a cell phone.

4. The method of claim 1, wherein said result is associated with a game result.

5. The method of claim 2, wherein said displaying information comprises displaying a plurality of objects on said display.

6. The method of claim 5, wherein said displaying information comprises displaying an indicator on said display, wherein said indicator at least in part moves relative to said plurality of objects.

7. The method of claim 6, further comprising determining a game result based, at least in part, on a relative position of said indicator and/or at least one of said plurality of objects at a time associated with a latency adjusted actuation of said input.

8. An apparatus comprising:
an electronic device, comprising:
an input device, and
a processor communicatively coupled to said input device, the processor configured to determine user activation of said input device, to determine a latency adjusted time of said user activation of said input device, said latency adjusted time being based on a latency of said electronic device in determining said user actuation of said input device, and to determine a result of said user activation of said input device based, at least in part, on said latency adjusted time.

9. The apparatus of claim 8, wherein said electronic device further comprises a display, and
wherein said processor is further configured to initiate display of information on said display, said information being based, at least in part, on said result.

10. The apparatus of claim 8, wherein said electronic device comprises a cell phone.

11. The apparatus of claim 10, wherein said result is associated with a game result.

12. The apparatus of claim 9, wherein said display of information comprises a plurality of objects.

13. The apparatus of claim 12, wherein said display of information comprises an indicator, wherein said indictor at least in part moves relative to said plurality of objects.

14. The apparatus of claim 13, wherein said result of said user activation of said input device is associated with a game result based, at least in part, on a relative position of said indicator and/or at least one of said plurality of objects at a time associated with a latency adjusted actuation of said input device.

15. An electronic device comprising:
means for determining user actuation of at least one input;
means for determining a latency adjusted time of said actuation of said at least one input, said latency adjusted time being based on a latency of said electronic device in determining said user actuation of said input; and
means for determining a result of said user actuation of said input, said result being adjusted based, at least in part, on said latency adjusted time, wherein said means for determining said result are within the electronic device.

16. The electronic device of claim 15, further comprising:
means for displaying information, said information being based, at least in part, on said result.

17. The electronic device of claim 16, wherein said electronic device comprises a cell phone.

18. The electronic device of claim 17, wherein said result is associated with a game result.

19. The electronic device of claim 16, wherein said information comprises a plurality of objects.

20. The electronic device of claim 19, wherein said information comprises an indicator, wherein said indicator, at least in part, moves relative to said plurality of objects.

21. The electronic device of claim 20, wherein said result of said user activation of said input is associated with a game result based, at least in part, on a relative position of said indicator and/or at least one of said plurality of objects at a time associated with a latency adjusted actuation of said input.

22. An article comprising:
a non-transitory, machine-readable storage medium comprising instructions configured to operatively enable an electronic device to:
determine user activation of at least one input of said electronic device;
determine a latency adjusted time of said user activation of said input, said latency adjusted time being based on a latency of said electronic device in determining said user actuation of said input; and
determine a result of said user actuation of said input, said result being based, at least in part, on said latency adjusted time, wherein said result is determined by said electronic device.

23. The article of claim 22, wherein said electronic device comprises a display, and wherein said storage media comprises instructions configured to operatively enable said electronic device to:
display information on said display, said information being based, at least in part, on said result.

24. The article of claim 22, wherein said electronic device comprises a cell phone.

25. The article of claim 22, wherein said result is associated with a game result.

26. The article of claim 25, wherein said information comprises a plurality of objects.

27. The article of claim 26, wherein said information comprises an indicator, wherein said indicator at least in part moves relative to said plurality of objects.

28. The article of claim 27, wherein said instructions are configured to operatively enable said electronic device to:
determine a game result based, at least in part, on a relative position of said indicator and/or at least one of said plurality of objects at a time associated with a latency adjusted actuation of said input.

29. A method performed by an electronic device, the method comprising:
displaying an object on a display of the electronic device;
determining a latency adjusted time of an actuation of an input of the electronic device, wherein the latency adjusted time is determined within the electronic device; and
calculating a result of said input actuation based, at least in part, on a position of said object as displayed on said display at said determined latency adjusted time, wherein the result is calculated within the electronic device.

30. The method of claim 29, further comprising displaying an indicator on said display, wherein the displayed indicator, at least in part, changes position relative to said object.

31. The method of claim 30, wherein calculating said result comprises determining a relative position between said indicator and said object at a time corresponding to said input actuation and/or said determined latency adjusted time.

32. The method of claim 31, wherein said electronic device comprises a cell phone.

33. The method of claim 32, wherein the actuated input comprises an input, and wherein said latency adjusted time is based, at least in part, on a latency associated with said electronic device determining user actuation of said input.

34. The method of claim 29, wherein the electronic device comprises a processor, and wherein said result of said input actuation is calculated using said processor.

* * * * *